US006716910B2

(12) United States Patent
König et al.

(10) Patent No.: US 6,716,910 B2
(45) Date of Patent: Apr. 6, 2004

(54) AQUEOUS AND/OR WATER-DILUTABLE POLYISOCYANATE CROSSLINKERS BLOCKED WITH DIISOPROPYLAMINE

(75) Inventors: Eberhard König, Leverkusen (DE); Jan Mazanek, Köln (DE); Heino Müller, Leverkusen (DE); Joachim Petzoldt, Monheim (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/192,446

(22) Filed: Jul. 10, 2002

(65) Prior Publication Data

US 2003/0045631 A1 Mar. 6, 2003

(30) Foreign Application Priority Data

Jul. 13, 2001 (DE) .......................................... 101 34 238

(51) Int. Cl.[7] .............................. C08J 3/00; C08K 3/20; C08L 75/00; B32B 27/00; C08G 18/81

(52) U.S. Cl. .................... 524/591; 428/423.1; 524/839; 524/840; 528/45

(58) Field of Search ................................ 524/591, 839, 524/940; 528/45; 428/423.1

(56) References Cited

U.S. PATENT DOCUMENTS

| 4,163,094 A | 7/1979 | Turpin ........................ 528/45 |
| 4,495,229 A | 1/1985 | Wolf et al. .............. 427/388.2 |
| 5,294,665 A | 3/1994 | Pedain et al. ............... 524/591 |
| 5,961,878 A | 10/1999 | König et al. ........... 252/182.21 |
| 6,063,860 A | 5/2000 | Rimmer et al. ............. 524/590 |
| 6,187,860 B1 | 2/2001 | König et al. ................ 524/591 |

*Primary Examiner*—Patrick Niland
(74) *Attorney, Agent, or Firm*—Joseph C. Gil; Gary F. Matz; Thomas W. Roy

(57) ABSTRACT

The invention relates to aqueous and/or water-dilutable polyisocyanate crosslinkers blocked with diisopropylamine, to their preparation and use in one-component baking lacquers, for example as fillers in automotive lacquering.

7 Claims, No Drawings

AQUEOUS AND/OR WATER-DILUTABLE POLYISOCYANATE CROSSLINKERS BLOCKED WITH DIISOPROPYLAMINE

FIELD OF THE INVENTION

The invention relates to an aqueous and/or water-dilutable polyisocyanate crosslinker blocked with diisopropylamine, to a process of their preparation and coating compositions containing the crosslinker, especially one-component baking lacquers used as fillers in the automotive field.

BACKGROUND OF THE INVENTION

The formulation of blocked polyisocyanate crosslinkers and optionally melamine-formaldehyde resins with, for example, hydroxyl-group-containing polyacrylates to so-called "one-component" baking lacquers is known in the art. If the lacquers in question are aqueous lacquers, the mentioned individual components must be dispersible in water and stable to storage in the aqueous phase for at least 6 months.

There are only a few isocyanate-blocking agents that fulfil those requirements. Butanone oxime is one such blocking agent, but it requires baking conditions of at least 30 minutes/140° C. in order to ensure crosslinking of the polyisocyanate blocked therewith. 3,5-Dimethylpyrazole is also a suitable blocking agent and leads to crosslinking of the polyisocyanate blocked therewith under baking conditions of only 30 minutes/130° C., as is disclosed, for example, in patent applications WO 97/12924 and EP-A 0 942 023. The disadvantage of 3,5-dimethylpyrazole is that it is relatively complex to prepare. 3,5-Dimethylpyrazole is obtainable on an industrial scale by condensation of acetylacetone and hydrazine hydrate, which is complicated for example, due to the properties of hydrazine hydrate.

Diisopropylamine is a readily obtainable isocyanate-blocking agent. It is known from the patent literature that it is used in powder coatings and coil coating lacquers, see EP-A 0 096 210 and EP-A 0 900 814.

Surprisingly, it has been found that polyisocyanates blocked with diisopropylamine are stable to storage in the aqueous phase and do not, for example, continuously liberate $CO_2$, as can be the case, for example, with polyisocyanates blocked with malonic acid diethyl ester or 1,2,4-triazole.

It is an object of the invention to provide storage-stable and readily obtainable aqueous or water-dilutable blocked polyisocyanate crosslinkers that have a lower crosslinking or baking temperature than polyisocyanate crosslinkers blocked with butanone oxime.

That object has been achieved with the blocked aqueous/water-dilutable polyisocyanate crosslinkers according to the invention.

SUMMARY OF THE INVENTION

The invention relates to an aqueous or water-dilutable blocked polyisocyanate crosslinker containing
a) 100 equivalent % of a polyisocyanate component,
b) from 50 to 85 equivalent % of diisopropylamine,
c) from 15 to 40 equivalent % of a monohydroxy- and/or dihydroxy-carboxylic acid as hydrophilizing agent, and optionally
d) from 0 to 15 equivalent % of a difunctional chain-extension component containing OH and/or $NH_2$ groups,
wherein the equivalent ratio of NCO groups of component a) to isocyanate-reactive groups of components b), c) and d) is from 1:0.8 to 1:1.2

The invention also relates to a process for the preparation of the blocked aqueous and/or water-dilutable polyisocyanate crosslinkers, which process is characterised in that the polyisocyanate component a) and, optionally, 30 wt. %, based on the delivery form of the blocked polyisocyanate crosslinker, of a water-miscible solvent are placed in a vessel and reacted in a first reaction step at approximately 80° C. with the monohydroxycarboxylic acid provided for the hydrophilization, the mixture is then cooled to approximately 50° C., and the NCO groups that remain are blocked by addition of diisopropylamine.

DETAILED DESCRIPTION OF THE INVENTION

The preparation of the blocked aqueous/water-dilutable polyisocyanate crosslinkers according to the invention can take place stepwise, for example as follows: the polyisocyanate component a) and, optionally, 30 wt. %, based on the delivery form of the crosslinker, of a water-miscible solvent, for example N-methylpyrrolidone, are placed in a vessel and reacted in a first reaction step at approximately 80° C. with the monohydroxycarboxylic acid provided for the hydrophilization. The mixture is then cooled to approximately 50° C., and the NCO groups that remain, approximately 80%, are reacted completely with diisopropylamine.

If hydrophilization is to be achieved using a dihydroxycarboxylic acid or a mixture of di- and mono-hydroxycarboxylic acid, it is possible, conversely, first to carry out the blocking reaction with diisopropylamine at approximately from 40 to 70° C.; the reaction with the hydrophilizing component subsequently takes place with the residual NCO groups. The formation of crosslinked gel particles can be avoided in that manner.

After addition of the neutralizing tertiary amine, for example dimethylethanolamine, the carboxylic acid groups are converted into hydrophilic carboxylate anions. It is then possible, for example, by the addition of further water-miscible solvent, to prepare a water-dilutable blocked polyisocyanate crosslinker having a solids content of approximately 65% and a viscosity (at 23° C.) of approximately 10,000 mPas or, by the addition of water, to prepare a water-dispersed blocked crosslinker having a solids content of approximately 30% and a viscosity (at 23° C.) of approximately 400 mPas.

The invention relates also to the combination of the aqueous and/or water-dilutable blocked polyisocyanate crosslinkers with water-soluble and/or dispersible polyhydroxyl compounds in the preparation of aqueous baking lacquers optionally containing conventional auxiliary substances and additives of coating technology. These combinations have advantages in automotive lacquering.

Polyisocyanates a) can be any known lacquer polyisocyanates having aliphatically and/or cycloaliphatically bonded isocyanate groups and an isocyanate content of from 7 to 30 wt. %, preferably from 12 to 25 wt. %. Preferred lacquer polyisocyanates include those that are based on 1,6-diisocyanatohexane (HDI), 1-isocyanato-3,3,5-trimethyl-5-isocyanatomethyl-cyclohexane (IPDI) and/or bis-(4-isocyanatohexyl)-methane ($H_{12}MDI$) and that contain biuret, isocyanurate, aminooxadiazinedione (asymmetric trimer), urethane and/or uretdione groups. It is also possible to use any desired prepolymers of those polyisocyanates with various polyols, such as polyesters, polyethers, polyacrylates or mixtures thereof.

It is also possible to use polyisocyanates or short-chain NCO prepolymers based on aromatic diisocyanates, such as, for example, diisocyanatotoluene (TDI) or 4,4-diisocyanatodiphenylmethane (MDI).

Polyisocyanates based on HDI or $H_{12}$MDI and containing isocyanurate groups are more preferred as component a).

Diisopropylamine is suitable according to the invention as the blocking agent from the group of the secondary amines. It is substituted or deblocked under the baking conditions of 130° C./30 minutes that are required industrially and, like butanone oxime or 3,5-dimethylpyrazole, blocks isocyanate groups in aqueous lacquers in a stable manner, without the liberation of $CO_2$ as a result of hydrolysis.

Suitable hydrophilizing components c) include preferably monohydroxy- and dihydroxy-carboxylic acids that carry one or two methyl groups in the (α-position. Particular preference is given to hydroxypivalic acid (hydroxymethyl-dimethylacetic acid) and mixtures of hydroxypivalic acid with dimethylolpropionic acid.

Suitable difunctional chain-extension components d) include diamines, diols and also hydroxyamines having a molecular weight in the range from 32 to 300. Examples include hydrazine, ethylenediamine, isophoronediamine, the bisketimine of isophoronediamine and methyl isobutyl ketone, 1,4-dihydroxybutane, ethanolamine, N-methyl-ethanolamine, hydroxyethylethylenediamine, the adduct of 2 mol of propylene carbonate and 1 mol of hydrazine of formula (I)

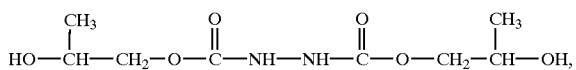

(I)

Suitable neutralizing agents include dimethyl-ethanolamine, methyl-diethanolamine, triethylamine, N-methylmorpholine or 2-amino-2-methylpropanol.

Suitable stabilizers to protect the crosslinkers against thermal yellowing include hydrazines and HALS amines (Hindered Amine Light Stabilizers) such as Tinuvin 770 DF (trade product of Ciba Corporation). Additives and further auxiliary substances can also be added.

The crosslinkers according to the invention can be used in a dispersed form either up to 80% by weight in a water-dilutable solvent or up to 50% by weight predominantly in water. Suitable water-dilutable solvents include butyl diglycol acetate, butyl diglycol, N-methylpyrrolidone or any desired mixtures thereof.

The polyisocyanate crosslinkers according to the invention have the following advantages:

The crosslinkers and the aqueous baking lacquers formulated therewith are stable to storage for at least 3 months.

The diisopropylamine blocking agent is an inexpensive, large-scale chemical.

The baking temperature of the aqueous lacquers is 30 minutes/130° C., and is therefore 10° C. lower than that of a crosslinker blocked with butanone oxime.

The simple composition and the good anticorrosive action (salt spray test) are demonstrated by means of the Examples which follow.

EXAMPLES

Example 1

According to the Invention

The preparation of a water-dilutable blocked polyisocyanate crosslinker is described.

a) Starting Materials

| | |
|---|---|
| 196 g (1.0 gram eq.) | of a commercially available isocyanurate-containing lacquer polyisocyanate based on 1,6-diisocyanato-hexane (HDI) having an NCO content of 21.4 wt. %, a viscosity at 23° C. of approx. 3000 mPas and a functionality of approx. 3.5 (Desmodur N 3300, trade product of Bayer AG, Germany) |
| 80.8 g (0.8 mol) | of diisopropylamine |
| 23.6 g (0.2 mol) | of hydroxypivalic acid |
| 16.0 g (0.18 mol) | of dimethylethanolamine |
| 146.0 g | of N-methylpyrrolidone |
| 462.4 g (0.8 gram eq.) | of blocked NCO groups |
| Solids content: | 65 wt. % (calc.) |
| Viscosity at 23° C.: | approx. 9000 mPas |
| Blocked NCO content: | 7.3 wt. % (calc.) |
| 1 gram eq. blocked NCO groups: | 575 g | b) Synthesis

Polyisocyanate, N-methylpyrrolidone and hydroxypivalic acid were heated to 80° C. with stirring at intervals. Stirring was continued at that temperature for approximately 2 hours, until the NCO content had fallen to approximately 9.1%. The mixture was then allowed to cool to approximately 40° C., and diisopropylamine was added dropwise, while the temperature was maintained at approximately 60° C. When the addition of diisopropylamine was complete, stirring was carried out for 15 minutes at 60° C. No further NCO groups could be detected thereafter by IR spectroscopy. Dimethylethanolamine was added, the mixture was allowed to cool, and the ready-for-use, pale-yellow solution of a water-miscible blocked polyisocyanate having the characteristic mentioned at the beginning was obtained.

Example 2

According to the Invention

The preparation of a blocked polyisocyanate crosslinker dispersed in water is described.

a) Starting Materials

| | |
|---|---|
| 196.0 g (1.0 gram eq.) | of the HDI trimer of Example 1 |
| 80.0 g (0.8 mol) | of diisopropylamine |
| 17.7 g (0.15 mol) | of hydroxypivalic acid, M 118 |
| 3.35 g (0.05 gram eq.) | of dimethylolpropionic acid, M 134 |
| 15.55 g (0.175 mol) | of dimethylethanolamine |
| 35.6 g | of N-methylpyrrolidone |
| 693.0 g | of water |
| 1042.0 g (0.8 gram eq.) | of blocked NCO groups |
| Solids content: | 30% (calc.) |
| Viscosity at 23° C.: | approx. 400 mPas |
| Blocked NCO content: | 3.2% (calc.) |
| 1 gram eq. blocked NCO groups: | 1303 g | b) Synthesis

The polyisocyanate was placed in a vessel and stirred. Starting from room temperature, diisopropylamine was carefully added dropwise thereto. The reaction proceeds exothermically, the temperature being maintained at 70° C. After about 1 hour, the addition of diisopropylamine was complete. The solution of hydroxypivalic acid, dimethylolpropionic acid and N-methylpyrrolidone was added; the mixture was heated to 80° C. and stirred at that temperature for about 2 hours until no further NCO groups could be detected by IR spectroscopy. Heating was then stopped, dimethylethanolamine was added, and after stirring for 10 minutes, and water was stirred in at a temperature of 50° C. A dispersion formed and was stirred for 3 hours at approximately 50° C. The dispersion was then cooled to room temperature with stirring, and stirring was carried out for a further 3 hours. The dispersed blocked polyisocyanate crosslinker had the above-mentioned characteristics.

Example 3

Comparison

This crosslinker blocked with butanone oxime had a composition analogous to that described in Example 2. It had the following characteristics:

| | |
|---|---|
| Solids content: | 41% |
| Viscosity at 23° C.: | approx. 5700 mPas |
| Blocked NCO content: | 3.9 |
| 1 gram eq. blocked NCO groups: | 1077 |

Example 4

Application a) Clear Lacquer Formulations

| Clear lacquer | 1 | 2 | 3 |
|---|---|---|---|
| Bayhydrol VP LS 2290, Bayer AG, 45% Lff., hydroxyl polyacrylate polyester dispersion, 1 gram eq. OH = 850 g | 30.1 | 30.5 | 30.3 |
| Bayhydrol PT 241, Bayer AG, 42% Lff., Hydroxyl polyester dispersion 1 gram eq. OH = 1889 g/Clear lacquer | 11.0 | 11.2 | 11.1 |
| Crosslinker according to Example 1 1 gram eq. NCO = 575 g | 24.1 | — | — |
| Crosslinker according to Example 2 1 gram eq. NCO = 1303 g | — | 55.4 | — |
| Crosslinker according to Example 3 (comparison) 1 gram eq. NCO = 1077 g | — | — | 45.4 |
| Cymel 328, 85% melamine resin, Trade product of Dyno Cytec GmbH, 41460 Neuss | 1.7 | 1.7 | 1.8 |
| Additol XW 395, trade product of Vianova Resin, flow agent | 0.6 | 0.6 | 0.6 |
| Surfinol 104 E, trade product of Air Product/Biesterfeld, wetting agent | 0.6 | 0.6 | 0.6 |
| Distilled water | 31.9 | — | 10.2 |
| Parts by weight | 100 | 100 | 100 |

The lacquer components of the above overview were mixed intimately by means of a stirrer. The OH components and the blocked crosslinkers were added in an equivalent ratio of 1:1. The effect of the addition of melamine resin was to improve a smooth surface quality.

b) Test of Storage Stability

| Clear lacquer | 1 | 2 | 3 |
|---|---|---|---|
| Solids content [%] | 35.2 | 36.3 | 37.7 |
| Runout time ISO beaker 5 mm/23° C. | 40 s | 22 s | 41 s |
| Runout time after 7 days' storage at 40° C. | 36 s | 23 s | 28 s |

Neither a significant increase in viscosity nor any sediment could be observed in the case of the above lacquers during storage.

c) Lacquer Properties

The above three lacquers were applied to the following substrates in a resulting dry film thickness of from 25 to 35 μm by means of a flow beaker spray gun having a nozzle (diameter 1.5 mm) and an atomizing pressure of 5 bar. The wet lacquer films were exposed to the air for 5 minutes at 23° C. and then baked in a circulating air oven. The substrates were glass panes in the case of the pendulum hardness and dissolvability tests, and degreased steel sheets in the case of the adhesion/cross-cut, Erichsen cupping and salt spray tests.

| Lacquer example | 1 | 2 | 3 (comparison) |
|---|---|---|---|
| Baking conditions: 30 min 130° C. | | | |
| Pendulum hardness 1) | 203 s | 212 s | 172 s |
| Solvent resistance 2) | | | |
| Toluene | 0 | 0 | 1 |
| Methoxypropyl acetate | 0 | 0 | 1 |
| Ethyl acetate | 4 | 4 | 4 |
| Acetone | 4 | 4 | 4 |
| Erichsen cupping 3) | >10 mm | >10 mm | >10 mm |
| Cross-cut (0–5) 4) | 0 | 0 | 0 |
| Salt spray test, 144 hours 5) | Wd 5 mm | Wd 5 mm | Wd 10 mm |

1) Pendulum hardness: vibration fatigue test according to König DIN 53 157
2) Solvent resistance 1 minute uncovered exposure to chemicals (index 0–5, 0 = no dissolution, 5 = complete dissolution)
3) Erichsen cupping according to DIN EN ISO 1520
4) Cross-cut according to DIN EN ISO 2409
5) Salt spray test according to DIN 53 167 Wd = migration from the DIN cut in mm As will be seen from the above tests, lacquers 1 and 2 containing the crosslinkers according to the invention were more reactive than lacquer 3, which contained the polyisocyanate crosslinker blocked with butanone oxime. The higher reactivity, which was based on the diisopropylamine blocking agent, was seen in the greater lacquer hardness, better solvent resistance and improved corrosion resistance (less migration of the salt solution beneath the lacquer).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous or water-dilutable blocked polyisocyanate crosslinker comprising
   a) 100 equivalent % of a polyisocyanate component,
   b) from 50 to 85 equivalent % of diisopropylamine, c) from 15 to 40 equivalent % of a monohydroxy- and/or dihydroxy-carboxylic acid as hydrophilizing agent, and optionally d) from 0 to 15 equivalent % of a difunctional chain-extension component containing OH and/or $NH_2$ groups, wherein the equivalent ratio of NCO groups of component a) to isocyanate-reactive groups of components b), c) and d) is from 1:0.8 to 1:1.2.

2. The blocked polyisocyanate crosslinker of claim 1 further comprising an additive.

3. A process for the preparation of a aqueous or water-dilutable blocked polyisocyanate crosslinker comprising reacting a polyisocyanate component in a first reaction step at approximately 80° C. with a monohydroxycarboxylic acid, cooling the mixture to approximately 50° C., and blocking the remaining NCO groups by addition of diisopropylamine.

4. The process of claim 3, wherein the reaction takes place in up to 30 wt. %, based on the finished form of the blocked polyisocyanate crosslinker, of a water-miscible solvent.

5. An aqueous coating composition comprising the aqueous or water-dilutable blocked polyisocyanate crosslinker of claim 1 and a water-soluble or dispersible polyhydroxyl compound.

6. A coated substrate composition prepared from the aqueous coating composition of claim 5 and an additive of coatings technology.

7. The coated substrate of claim 6 wherein the substrate is a part in the automotive industry.

* * * * *